Feb. 8, 1966  A. M. A. FERTÉ  3,233,681
IMPLEMENT CONTROL DEVICE FOR PLANT THINNING MACHINES
Filed Dec. 27, 1963  4 Sheets-Sheet 1
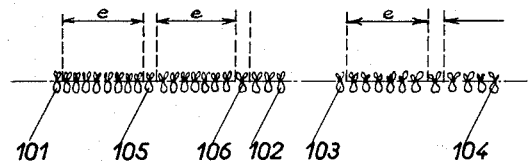
Fig.: 1
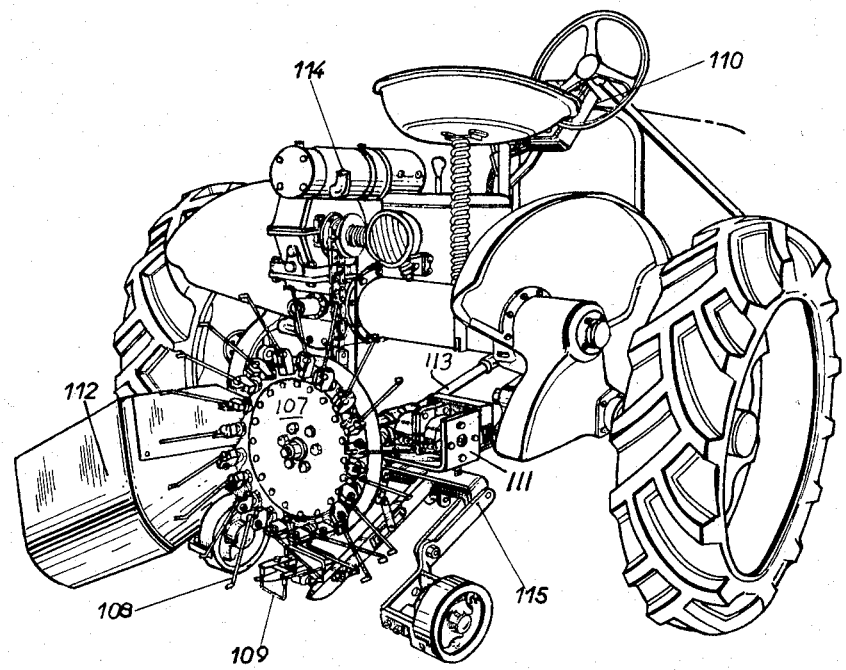
Fig.: 2

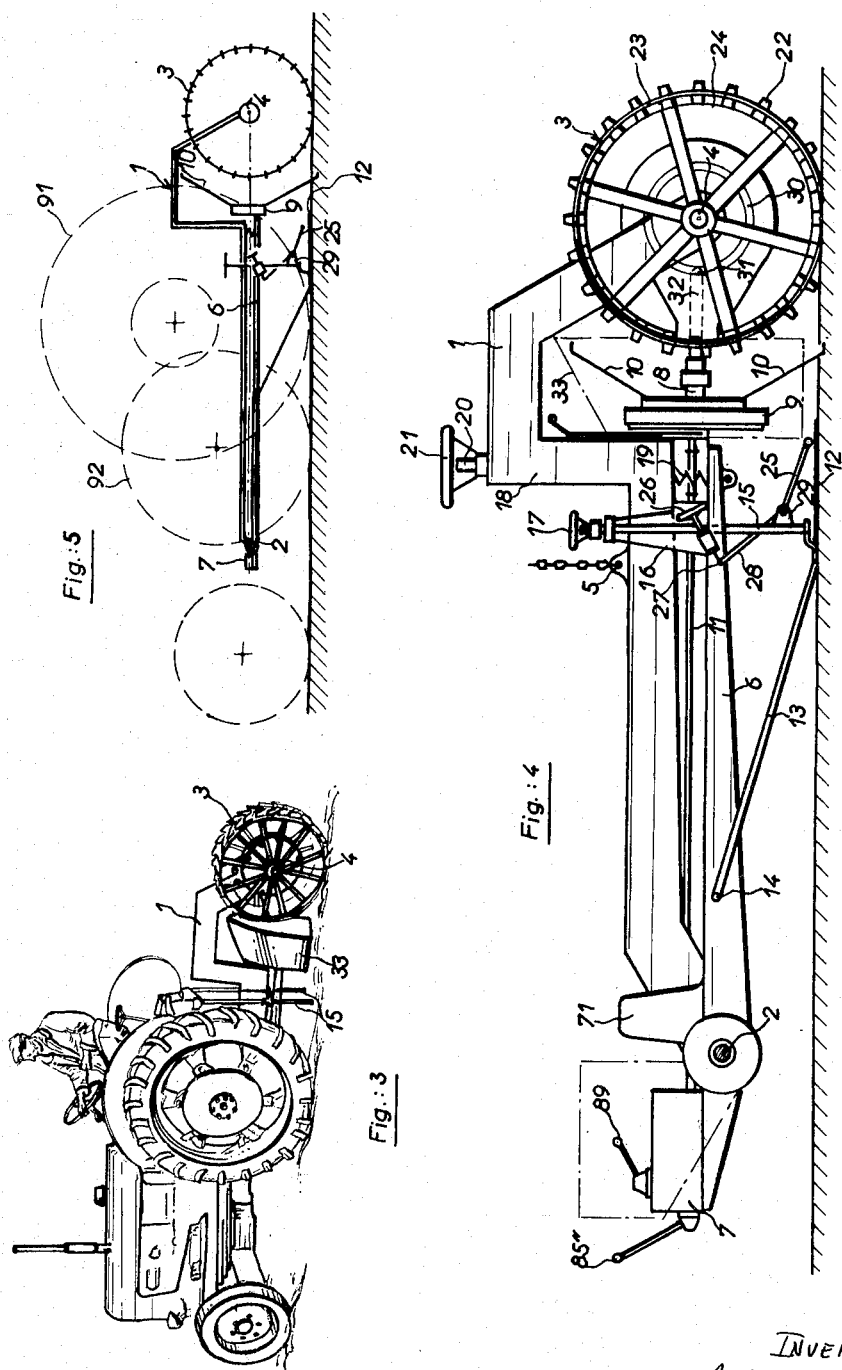

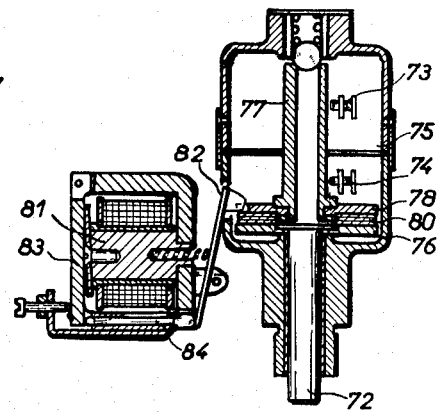
Fig.: 7
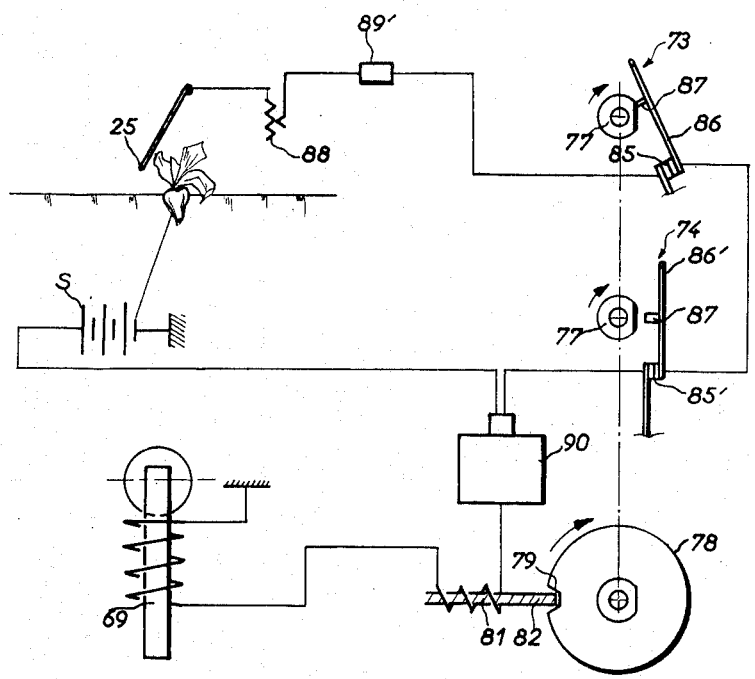
Fig.: 6

Feb. 8, 1966     A. M. A. FERTÉ     3,233,681
IMPLEMENT CONTROL DEVICE FOR PLANT THINNING MACHINES
Filed Dec. 27, 1963     4 Sheets-Sheet 4
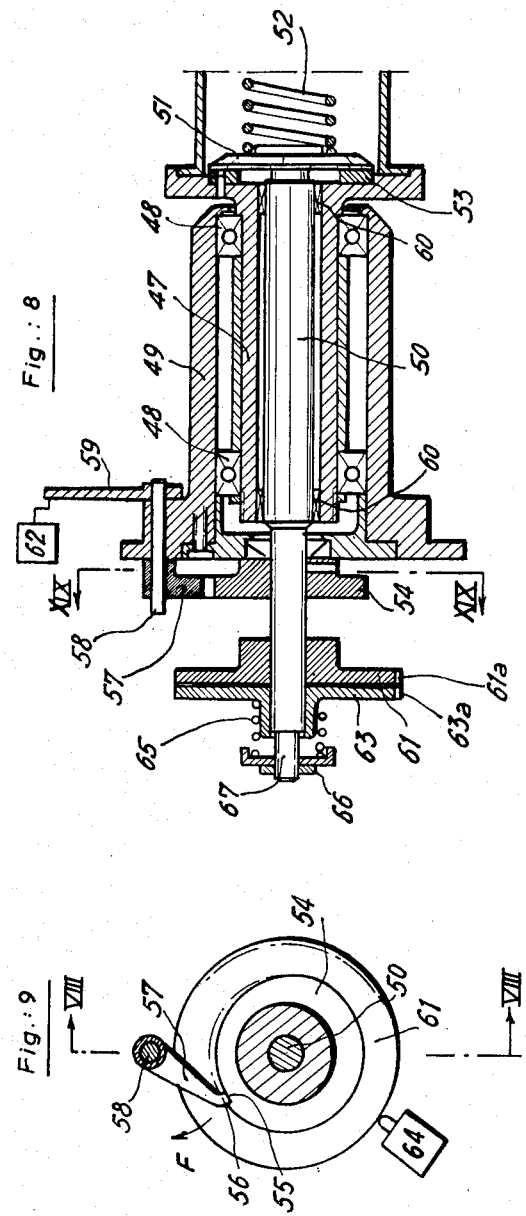

ated Feb. 8, 1966

3,233,681
IMPLEMENT CONTROL DEVICE FOR PLANT
THINNING MACHINES
André Marie Auguste Ferté, Terny-par-Margival, Aisne,
France, assignor to Georg Christof Gugenhan, Duren,
Rhineland, Germany
Filed Dec. 27, 1963, Ser. No. 333,823
Claims priority, application France, Jan. 4, 1963,
920,473; Aug. 30, 1963, 946,184
6 Claims. (Cl. 172—6)

This invention relates to improvements to farming machines, and more particularly to thinning-out machines of the type used especially for the cultivation of beetroot.

It is well known that the thinning-out operation is carried out during the growth of plants sown in rows and which are closely hugged together or not as they grow. It consists in destroying certain of these plants in order to permit normal growth of the subsisting ones.

A row of beetroot to be thinned out appears in the form shown in FIGURE 1 of the accompanying drawing. A first plant 101 is followed up to 102 by plants concentrated over a small distance. From 102 up to 103 is a space devoid of plants as the result of poor germination. At 103 begins a fresh series of plants which runs as far as 104.

The purpose of thinning out is to provide a minimum free space *e* between consecutive plants. This result is achieved by removing all the plants in the gap *e* after the plant 101, while sparing the plant 105, by destroying once more the plants along the interval *e* beyond 105 while sparing the plant 106, by destroying the remaining plants concentrated up to 102 (the interval 106-102 being smaller than *e*) and by repeating the process from the first spared plant 103, provided of course that the interval 106-103 be greater than *e*.

Latterly, this thinning-out work has been accomplished on an industrial basis with the aid of a farming machine, one model of which is shown in FIGURE 2.

This known machine comprises a rotary cutter 107 mounted on a tractor and provided with knives 108 adapted to destroy all plants in its path, said knives being retracted in order to spare the plants which must subsist. Retraction of the knives is controlled automatically by means of a feeler 109 positioned in the vicinity of the cutter, slightly ahead thereof with reference to the direction of travel of the tractor. The reaction of the feeler on contact with a plant is transmitted to a suitable electronic device housed in an enclosure 110 in front of the driver's seat, which device is devised to interpret the reaction of the feeler and to accordingly generate the appropriate knife control signals which energize or de-energize an electromagnet 111 for retracting or extending the knives.

In FIGURE 2, reference numeral 112 designates a mudguard, 113 the mechanical transmission system, 114 an electric raising jack, and 115 the rear carriage.

The present invention has for its object to provide an improved farming machine offering numerous advantages in comparison with the prior art machines of the kind hereinbefore described, particularly by reason of the simplified construction and control and the reduced cost price.

One such improvement relates to the manner of mounting the implement-support and of driving the same.

In accordance with this invention, the implement-support is not mounted directly on the tractor as on the machines used heretofore, but on a separate chassis coupled to the tractor, the coupling being preferably obtained through the agency of a horizontal cross-shaft onto which the front part of the chassis is articulated. Said chassis is provided at its rear with one or more wheels, the implement-support being positioned at a longitudinally intermediate point on said chassis, between said articulation shaft and said wheel or wheels.

The implement-support is mounted on the chassis in preferably non-rigid and more specifically resilient fashion and is provided with a degree of vertical relative movement, its weight tending to counter the action of a spring interposed between the implement-support and the chassis. Such a resilient form of mounting offers, among other advantages, that of enabling, by adjustment of the spring strength, a more or less large fraction of the weight of the implement-support, according to working and terrain conditions, to be transferred to the chassis and hence to its coupling cross-shaft and its wheel or wheels.

Thus, in contradistinction to prior art thinning-out devices, the implement-support of the machine according to this invention does not take its drive from the tractor drive shaft but from an auxiliary device which drives the implements strictly as a function of the actual displacement of the tractor. There is thereby automatically obtained, without further precautions, good precision and uniformity in the beetroot thinning-out operation, regardless of possible speed variations of the tractor.

Control of retraction and extension of the implements used for this thinning-out operation, by energizing and de-energizing an electromagnet, is provided through an electric circuit comprising the plant feeler, a make-and-break device, and a suitable source of direct current for instance, the feeler providing an earth each time it is in contact with a plant.

The make-and-break device which is intended to determine the required sequence of retraction and extension of the implements for performing the desired thinning-out, is usually of great complexity and high cost, particularly in the case of modern farming machines in which the device is of the electronic type and comprises pulse generators and counters as well as other delicate and costly components.

This invention relates to an improved control means of the implements, in accordance with which the make-and-break device is purely mechanical and comprises, in the energizing circuit of the implement control electromagnetic device, two contact-breakers in series associated to a rotating cam and whose relative angular position is adjustable. Thus, the energizing circuit closes when both cam-type contact-breakers are simultaneously in the closed position, and the circuit will remain closed as long as this situation obtains, the duration depending on the rotation speed of the cam and the relative angular shift between the two contact-breakers.

The description which follows with reference to the accompanying non-limitative exemplary drawings will give a clear understanding of how the invention can be carried into practice.

Referring to the drawings filed herewith:

FIGURE 1 shows in schematic horizontal projection a row of plants, illustrating the thinning-out principle described in the foregoing preamble.

FIGURE 2, to which reference has likewise been made in the preamble, shows in perspective a prior art farming machine used for thinning-out beetroot.

FIGURE 3 is a similar view of a tractor equipped with a cutter-supporting chassis according to the invention.

FIGURE 4 is a schematic elevation view of said chassis.

FIGURE 5 shows the manner of coupling the cutter-holding device to two different tractors.

FIGURE 6 is a basic diagram of the electric circuit for energizing the implement controlling electromagnet.

FIGURE 7 shows in axial section the make-and-break device of said circuit.

FIGURE 8 shows in longitudinal section taken through the line VIII—VIII of FIGURE 9 an alternative form of embodiment of the implement controlling electromechanical apparatus, and FIGURE 9 is a cross-section taken through the line IX—IX of FIGURE 8.

In FIGURES 3 and 4, reference numeral 1 designates a rigid frame built up from sectional irons and articulated onto the tractor at one of its ends through the medium of a shaft 2, the other extremity being supported by one or two wheels 3 symmetrically positioned relative to the frame on a common axle 4. The articulation shaft 2 about which the system as a whole pivots during the raising operation (effected by means of a chain secured at 5), likewise bears a cutter-supporting chassis 6, at the front part of which is mounted an enclosure 7 containing the automatic control switchgear for the cutter implements and also a portion of the adjustment gear. At its rear, said chassis mounts the shaft 8 of the rotary cutter 9, which cutter bears a number of implements 10. Said shaft 8 extends forwardly to 11 whereby to provide a synchronous mechanical coupling between the implement-carrying cutter and the control components contained in enclosure 7. To either side of chassis 6 are provided two types of shoes 12 dependent from rods 13 pivotally connected to the chassis at 14. Said shoes rest on the ground and upon them bears indirectly the rear end of said chassis through two bars 15 of which one extremity bears on shoe 12 and the other threaded extremity is connected to chassis 6 through a gusset 16, which gusset is provided at its top with a swivel joint to a threaded handwheel 17 which can be rotated in either direction to adjust the ground clearance beneath the free end of the chassis.

The rotary cutter assembly is retained by an axial portion secured on a support which is slidable upwardly or downwardly in a vertical part 18 provided for the purpose in the structure of the wheel-supporting frame 1, said support of the cutter-holder resting indirectly on the extremity of chassis 6 through the medium of a set of compensating springs 19 which are adjustable by means of a screw 20 operable by the handwheel 21, and which, through the medium of axle 4 and the arched portion of frame 1, impart to wheels 3 (in addition to their own weight) an extra vertical pressure of adjustable magnitude resulting from the weight of the cutter, which weight can act on frame 1 in full, or else in part compensated by the springs 19 bearing on chassis 6. This disposition produces varying adhesion of the spurs 22 on soil that may be more or less firm. The spurs are of trapezoidal cross-section for easy disengagement; the spurs are arranged in two mutually staggered sets, each set of spurs extending from a rim 23 and bearing upon a central crown 24 which generates, to either side of the plane of symmetry, two frusto-conical surfaces which counter any tendency of the two wheels to move sideways.

In short, the total weight of the assembly hereinbefore described acts upon the shaft 2 fixed to the tractor, on the shoes 12 which are part of the chassis 6 and which rest on the ground, and on the wheels 3 which are associated to the frame 1 and which likewise bear on the ground, the constant fraction of the weight jointly supported by these two members being distributed in a variable ratio.

In the vertical centerplane of the assembly in which the axis of the cutter 9 lies is mounted, ahead of said cutter, a feeler member 25 which is electrically insulated from the body of the assembly and devised in accordance with those described in United States Patent Nos. 2,535,720 and 3,027,950. The active extremity of this feeler is adapted to be spaced from the ground by a variable quantity dependent upon the height of the plants at the time the operation is to be performed, such variable spacing being obtained in any convenient way, an example being by means of handwheel 26 in conjunction with a screw 27 whose end acts upon a lever 28 pivotally connected to a shaft 29 extending through two gussets welded respectively to the two bars 15.

The two wheels 3, which are of fairly large diameter in order to provide a large mechanical advantage, furnish the motive power to the cutter 9 through the agency of a bevel coupling consisting of a bevel gear 30 keyed to axle 4 and a bevel pinion 31 supported on the end of a shaft 32 adapted to drive, through a convenient cardan coupling, the shaft 8 which rotates the cutter, the retractable implements 10 of said cutter being protected by a frusto-conical half-casing 33 which at the same time provides containment for the projections of earth which occur as work proceeds.

At this stage of the description, it would be judicious to make a number of observations:

The distance between cutter 9 and the articulation shaft 2 borne by the tractor is sufficiently large for vertical movements of said tractor resulting from irregularities of the terrain not to be transmitted to the cutter.

The shoes 12, the feeler 25 and the cutter 9 are sufficiently close to one another for the implements 10 to work at constant depth irrespective of consecutive irregularities of the terrain.

The disposition hereinbefore disclosed, by virtue of the articulated attachment of the machine onto a single shaft 2 borne by the tractor, permits, firstly, coupling the machine to all types of tractors, be they high or low, or even devoid of a power take-off; secondly, it enables a single tractor to be equipped with a plurality of such cutter-supporting assemblies. Lastly, the risk of one end of the tractor lifting when the machine is raised is for all practical purposes eliminated by reason of the fact that shaft 2 is always located between the front and rear wheels. This can be clearly seen from FIGURE 5, which schematically illustrates the manner of coupling onto a medium-sized tractor with an axially located axle 91 or onto a small tractor with a raised axle 92.

The mechanical, electrical and electronic control devices contained in enclosure 7 are in direct relation with the shaft 11 driven by the wheels 3. The shaft operates a speed variator 71 whose output shaft controls the drive shaft 72 (see FIGURE 7) of a device comprising two stepped contact-breakers 73 and 74 contained in an enclosure 75. A disc 76 rigid with shaft 72 is adapted to rotate a flat-sided bush 77 (see also FIGURE 6), and said bush acts as a cam fixed to a disc 78 bearing a notch 79 thereon, with an interposed friction washer 80. On being energized, an electromagnet 81 operates a rocking locking finger 82 through the movement of its mobile armature 83, the extremity of which acts on the pusher 84, thereby releasing the cam-bearing disc 78 which is thus instantly driven at the speed of shaft 72. Each of the two contact-breakers 73 and 74 consists of a fixed contact stud 85 (or 85') and a movable contact supported on an arm 86 (or 86'). The end of said arm remote from the contact is held stationary and said arm bears an insulated cam-follower 87 which, when riding over the cylindrical part of cam 77, separates the contacts and opens the circuit or circuits into which said contacts are connected. In the case of each contact-breaker set, the circumferential position of the cam-follower can be adjusted by slightly displacing the retention point of arm 86.

FIGURE 6 shows the circuit diagram of the installation. The sensitive portion of feeler 25 encounters a plant to be preserved and earths an electric circuit which runs from a source S and comprises a rheostat 88 adjustable by means of lever 89 (FIGURE 4) to suit hygrometric conditions, followed by a transistorized amplifier 89', the contact 85 which is fractory-adjusted, the contact 85' which is adjusted in situ according to the number of implements to be retracted by means of lever 85" (FIGURE 4), said circuit comprising a shunt which leads through another transistorized amplifier 90, which amplifier feeds the two electromagnets 81 and 69 in series, the lattermentioned electromagnet determining operation of the implements.

Reference to the diagram shows that the cam 77 is held stationary in a position such that the contacts 85 and 85' are closed, so that contact by feeler 25 with a plant will close the circuit and energize electromagnet 69, thus retracting a number of the implements rotated by the cutter whereby to spare the plant; this, in short, is a form of self-protection. Simultaneously, on being energized, the cam releasing electromagnet 81 frees disc 78 and hence also the cam, which cam then rotates through 360°, in the course of which the cam-followers 87 riding over the cylindrical part of the cam will separate the contacts 85 and 85', thereby making it impossible to reclose the circuit referred to even if the feeler 25 should encounter another plant, which plant will then be destroyed through the implements not having been retracted due to non-energization of electromagnet 69. The time of revolution of cam 77 corresponds to the gap separating two consecutive plants on the ground, which distance can be adjusted by varying the rotation speed of driveshaft 72 through the agency of variator gear 71.

The alternative form of embodiment shown in FIGURES 8 and 9 is likewise devised to generate the required control signals and permit such adjustment as may be necessary.

As in the preceding example, it is driven through a convenient speed variator by one or more wheels on the towed frame, which wheels roll without slipping on the ground during forward travel of the tractor and furnish the drive to the implements.

Thus, the drive from said frame wheel or wheels rotates a hollow shaft 47 rotating in bearings 48 supported in a housing 49 secured to the machine frame. Within said hollow shaft 47 is rotatable in bearings 60 a coaxial shaft 50 which is rigid with one extremity of a disc 51 biased by a spring 52 against a bush 53 made of "Du Glacier" and fitted over hollow shaft 47. The assembly 51, 53 forms a clutch for driving shaft 50 off shaft 47 but permitting relative slip therebetween in the event of shaft 50 being prevented from rotating.

Said shaft 50 bears a disc 54 having thereon a peripheral latching notch 55 into which is engageable the tip 56 of a locking pawl 57 mounted on a pivot 58 to which is keyed an arm 59 adapted to be tilted by an electromagnet 62 whereby to disengage pawl 57 in the direction of arrow F from a locking notch 55. Upon shaft 50 is likewise fixed a generally circular cam 61 embodying a recessed arcuate bearing surface 61a extending, say, over 180°. A second similar cam 63 is mounted in angularly adjustable fashion on shaft 50 and has a similar arcuate portion 63a. This second cam 63 is maintained in pressure contact with the first cam 61 by a spring 65 which is adjustable by means of a nut 66 engaging with the threaded end 67 of shaft 50.

These two coordinated cams operate a normally-closed microswitch 64 inserted into the excitation circuit of electromagnet 62, in series with the plant feeler. Said microswitch is likewise connected into the circuit for energizing or supplying the electrical device (electromagnet) controlling the implements.

When the feeler detects, by contact, the presence of a plant, an earthing path is provided which closes the circuit for energizing electromagnet 62, thereby disengaging pawl 57 from notch 55 and freeing disc 54. The shaft 50 is then driven by shaft 47 through the clutch 51-53, which then ceases to slip. Shaft 50 can then complete a full revolution until the pawl tip 56 lockingly engages anew with the latching notch 55, thereby restraining shaft 50 and causing clutch 51-53 to slip. It will of course be understood that locking would not take place if the feeler were at this moment to detect another plant, since microswitch 64 is closed when the cam-carrying shaft 50 is in the angular position corresponding to locking thereof.

It will be manifest that a shift of cam 63 relative to cam 61 will modify the operative angle of the microswitch and hence also its relative closing and opening times; in other words, the pulse duration is a function of the relative angular settings of the two cams. During this time, the device controlling the implements remains energized, being de-energized when the cams reach the end of their travel.

Microswitch 64 is opened during the rotation time of said cams beyond their positive operating times, in consequence whereof detection of another plant by the feeler remains without effect since the circuit can be closed only provided that the dual requirements of microswitch 64 being closed and the feeler touching a plant are satisfied simultaneously.

The rotation time of the cams corresponds to the gap separating two consecutive plants to be spared on the ground. Thus it will be seen that the number of plants to be preserved over a given distance depends only on the time required for the cam-bearing shaft 50 to complete a full revolution, which time in turn depends upon the speed of the tractor. Thus the implements operate solely as a function of the distance covered by the tractor.

What is claimed is:

1. A farming machine designed for performing thinning out operations on beetroot and the like by means of electromagnetically-controlled retractable implements, comprising an energizing circuit for the electromagnetic control of said implements, a source of electric current, a plant feeler and two switches connected in series in said circuit, a rotary member adapted to actuate each of said switches to opening and closure once for every revolution of said member, mechanical drive means responsive to the progression of said machine for driving said rotary member, and means for angularly adjusting the position of one switch relative to the other with respect to said rotary member whereby the fraction of the revolution of said member during which the switches are simultaneously closed is adjusted accordingly.

2. A machine as claimed in claim 1, wherein the implements are controlled to inoperative position upon energization of said circuit during simultaneous closure of said switches and to operative position upon de-energization of said circuit when either of said switches is opened.

3. A machine as claimed in claim 2, comprising further a yieldable transmission between said mechanical drive means and said rotary member, withdrawable means for locking said rotary member in a predetermined angular position in the revolution thereof, and electromagnetic control means in said energizing circuit for withdrawing said locking means upon energization of said circuit whereby said rotary member is driven through said yieldable transmission to perform a whole revolution.

4. A machine as claimed in claim 3, wherein said mechanical drive means comprises a driving shaft, said rotary member comprises a driven shaft, and said yieldable transmission comprises a friction clutch having a driving disc fast with said driving shaft and a driven disc fast with said driven shaft, said locking means being designed for engaging said driven disc.

5. A farming machine designed for performing thinning-out operations on beetroot and the like by means of electromagnetically-controlled retractable implements, comprising an energizing circuit for the electromagnetic control of said implements to inoperative position upon energization of said circuit, a source of electric current, a plant feeler and two switches connected in series in said circuit, whereby said circuit to be energized requires both said switches in their closed position, a rotary cam having a part cylindrical surface and a flat chordwise surface, said cam being adapted to rotate about the axis of said cylindrical surface, a cam-follower formed with each switch to engage said surfaces upon revolution of said cam, the arangement being such that each switch is in closed position when the cam-follower thereof engages said flat surface and in opening position when said cam-follower engages said cylindrical surface, mechanical drive means responsive to the progression of said machine for driving said rotary cam, and means for angularly adcam, the arrangement being such that each switch is in with respect to said rotary cam whereby the fraction of the revolution of said cam during which the switches are simultaneously closed is adjusted accordingly.

6. A machine as claimed in claim 5, wherein the angular setting of the cam-follower of at least one of said switches with respect to said cam is adjustable.

References Cited by the Examiner
UNITED STATES PATENTS

| | | | |
|---|---|---|---|
| 2,177,803 | 10/1939 | Ferte et al. | 172—6 |
| 2,507,001 | 5/1950 | Ferte | 172—6 |
| 2,535,720 | 12/1950 | Boncompain | 172—6 |
| 2,700,923 | 2/1955 | Marihart | 172—6 |
| 2,864,292 | 12/1958 | Elliott et al. | 172—6 |
| 2,894,178 | 7/1959 | Chesebrough et al. | 172—6 X |
| 3,027,950 | 5/1962 | Cascarine | 172—5 |
| 3,097,702 | 7/1963 | Cracknell et al. | 172—6 |

ABRAHAM G. STONE, *Primary Examiner.*

T. GRAHAM CRAVER, *Examiner.*

F. B. HENRY, *Assistant Examiner.*